US 6,422,080 B1
Jul. 23, 2002

(12) United States Patent
Lalouette

(10) Patent No.: US 6,422,080 B1
(45) Date of Patent: Jul. 23, 2002

(54) RESONANCE CONTROL METHOD FOR A DISC DRIVE ACTUATOR ASSEMBLY HAVING DISCRETE BEARINGS

(75) Inventor: Marc J. Lalouette, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/704,177

(22) Filed: Oct. 31, 2000

Related U.S. Application Data

(60) Provisional application No. 60/180,709, filed on Feb. 7, 2000.

(51) Int. Cl.⁷ .................................................. C01H 1/00
(52) U.S. Cl. ............................ 73/579; 73/1.82; 73/593; 73/660
(58) Field of Search ........................ 73/579, 1.82, 1.84, 73/593, 862.59, 862.41, 660, 668, 662, 663; 360/75

(56) References Cited

U.S. PATENT DOCUMENTS

| 4,682,255 | A |   | 7/1987  | Sleger et al. ............... 360/106 |
| 4,893,206 | A |   | 1/1990  | Shtipelman et al. ........ 360/106 |
| 5,311,763 | A | * | 5/1994  | Gibbs, Jr. et al. ................. 73/9 |
| 5,315,465 | A |   | 5/1994  | Blanks ....................... 360/106 |
| 5,341,569 | A |   | 8/1994  | Takamizawa et al. .... 29/898.09 |
| 5,509,198 | A |   | 4/1996  | Takamizawa et al. .... 29/898.09 |
| 5,510,940 | A |   | 4/1996  | Tacklind et al. ............ 360/106 |
| 5,627,702 | A |   | 5/1997  | Kelemen et al. ............ 360/106 |
| 5,729,406 | A |   | 3/1998  | Faris .......................... 360/106 |
| 5,768,060 | A |   | 6/1998  | Albrecht et al. ............ 360/106 |
| 5,835,309 | A |   | 11/1998 | Boutaghou .................. 360/106 |
| 5,905,608 | A | * | 5/1999  | Frees et al. ................. 360/106 |
| 5,978,180 | A |   | 11/1999 | Lee et al. ................... 360/106 |
| 5,979,249 | A | * | 11/1999 | Koo et al. ............. 73/862.541 |
| 6,088,185 | A | * | 7/2000  | Ratliff et al. ............. 360/77.03 |
| 6,163,441 | A | * | 12/2000 | Wood et al. .............. 360/266.1 |
| 6,196,062 | B1| * | 3/2001  | Wright et al. .................. 73/105 |
| 6,229,664 | B1| * | 5/2001  | Albrecht et al. .............. 360/75 |
| 6,310,749 | B1| * | 10/2001 | Beatty et al. ............. 360/265.7 |
| 6,330,828 | B1| * | 12/2001 | Nagl et al. ..................... 73/668 |

* cited by examiner

Primary Examiner—Hezron Williams
Assistant Examiner—Jacques Saint-Surin
(74) Attorney, Agent, or Firm—John R. Wahl; Merchant & Gould P.C.

(57) ABSTRACT

A method of measuring the vibration of an actuator assembly in a disc drive in the plane of rotation of the actuator assembly and determining the resonance behavior of the actuator assembly from the measured vibrations is disclosed. The method involves use of a laser to measure the vibrational behavior of the actuator assembly in the rotational plane. A method is described for adjusting the resonance behavior of the actuator assembly during the manufacturing process without the use of glue or extra parts. The resonance behavior is determined and the preload on the bearings in the actuator assembly is adjusted until a desired resonance behavior is achieved.

20 Claims, 3 Drawing Sheets

RESONANCE CONTROL METHOD FOR A DISC DRIVE ACTUATOR ASSEMBLY HAVING DISCRETE BEARINGS

RELATED APPLICATIONS

This application claims priority of U.S. provisional application Ser. No. 60/180,709, filed Feb. 7, 2000.

FIELD OF THE INVENTION

This application relates generally to disc drive actuator assemblies and more particularly to a discrete bearing assembly for an actuator assembly.

BACKGROUND OF THE INVENTION

Conventional disc drive actuator assemblies may have discrete bearing assemblies. These discrete bearings are typically preloaded with a preload spring or a glued arrangement. Resonant behavior of such bearing systems is not directly monitored or controlled. The resonant behavior of actuator assemblies utilizing these discrete bearing assemblies is usually related to the amount of preload on the bearings.

Other actuator assembly designs utilize a cartridge bearing that includes a separate sleeve. These cartridge bearings typically have their preload set utilizing a dead weight and glue on the cartridge alone. For example, NSK (Nippon Steel K) measures the axial resonant frequency of the cartridge bearing during a push fit operation that sets the preload in the cartridge bearing. This push fit operation does not take into account the radial stiffness of the attachment method to the actuator or the resonance of the whole actuator assembly, however, since it is done on the cartridge alone. In addition, the push fit operation does not take into account resonance of the actuator assembly after it has been fastened to the base plate in the disc drive. Consequently, the radial stiffness and resonance of the whole actuator assembly is simply not addressed. This results in less than predictable actuator assembly resonance performance when the actuator assembly is actually operated and unpredictable performance of the disc drive as a whole. Accordingly, there is a need for a bearing assembly that permits a more predictable resonance behavior when installed in the disc drive.

SUMMARY OF THE INVENTION

Against this backdrop the present invention has been developed. One embodiment of the present invention is a method of measuring the vibration of the actuator assembly in the plane of rotation of the actuator assembly and determining the resonance behavior of the actuator assembly from the measured vibrations. This method is superior to the prior art in that it directly determines the resonance behavior in the plane of rotation of the actuator assembly and also determines the resonance behavior of the assembly after it has been fastened to the drive.

Another embodiment of the present invention permits the easy adjustment of the actuator assembly resonance behavior during the manufacturing process without requiring gluing or extra parts and without the error introduced by measuring the resonance behavior before the final assembly of the actuator assembly to the drive. The pivot bearing assembly in accordance with the present invention incorporates an actuator pivot pin that also functions as a preload adjustment screw. The pivot pin has a head portion, a cylindrical shaft portion, and a distal threaded end portion. The pivot bearing assembly includes a pair of discrete bearing assemblies mounted on the cylindrical shaft portion of the pivot pin. Sandwiched between the bearings on the pivot pin is a pivot portion of the actuator arm. Each bearing assembly includes an outer race sleeve and an inner race sleeve concentrically spaced apart by ball bearings. When the two bearing assemblies are placed on the pivot pin with the actuator pivot portion sandwiched therebetween, and the threaded portion of the pin is threaded into the base plate of the disc drive, the head portion of the pin contacts the inner race of the upper bearing. The inner race of the lower bearing contacts the base plate. The outer races of the upper and lower bearing assemblies each contact the pivot portion of the actuator arm. The base plate is formed with a raised shoulder around the threaded bore receiving the threaded portion of the pivot pin. The outer race of the lower bearing is beyond the shoulder and thus does not contact the base plate. The shoulder permits the actuator arm to rotate freely on the bearings in a plane of rotation orthogonal to the pivot pin. Tightening the pivot pin into the base plate places a preload force through the bearing assemblies onto the actuator arm.

A laser measuring device aimed at a benchmark on the actuator arm is used to measure vibration of the actuator arm in the plane of rotation of the actuator arm as the pivot screw is tightened during drive manufacture. Resonance behavior of the actuator assembly in the plane of rotation is determined from the measured vibration. Based on the determined resonance behavior, the pivot screw is further tightened or loosened to adjust the preload on the bearing assemblies to provide optimum resonance performance of the actuator assembly. In this arrangement, the preload is applied during final drive assembly, and thus the preload force can be optimized to account for all sources of resonance vibration from the drive as well as permit adjustment for radial stiffness and actual resonance performance.

These and various other features as well as advantages that characterize the present invention will be apparent from a reading of the following detailed description and a review of the associated drawings.

DETAILED DESCRIPTION

Figure 1:
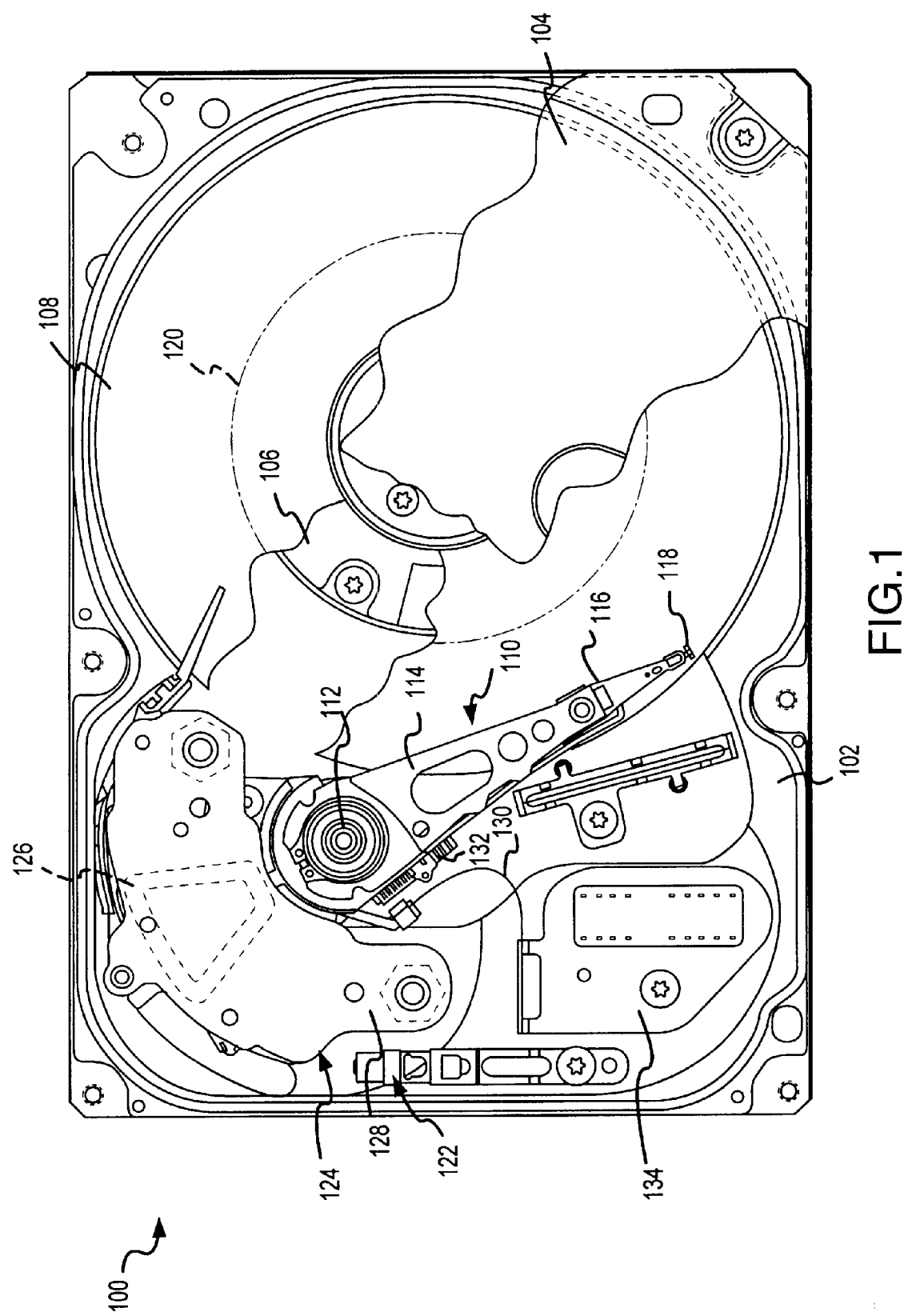
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation in a plane about a pivot pin 112 positioned adjacent the discs 108. The actuator assembly 110 includes an includes an actuator arm 114 that extends towards the disc 108, with one or more flexures 116 extending from the actuator arm 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots in a plane about the pivot pin 112, and the heads 118 are caused to move across the surfaces of the discs 108.

The spindle motor 106 is typically de-energized when the disc drive 100 is not in use for extended periods of time. The heads 118 are moved over park zones near the inner diameter of the discs 108 when the drive motor is de-energized. The heads 118 are secured over the park zones through the use of an actuator latch arrangement 122, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
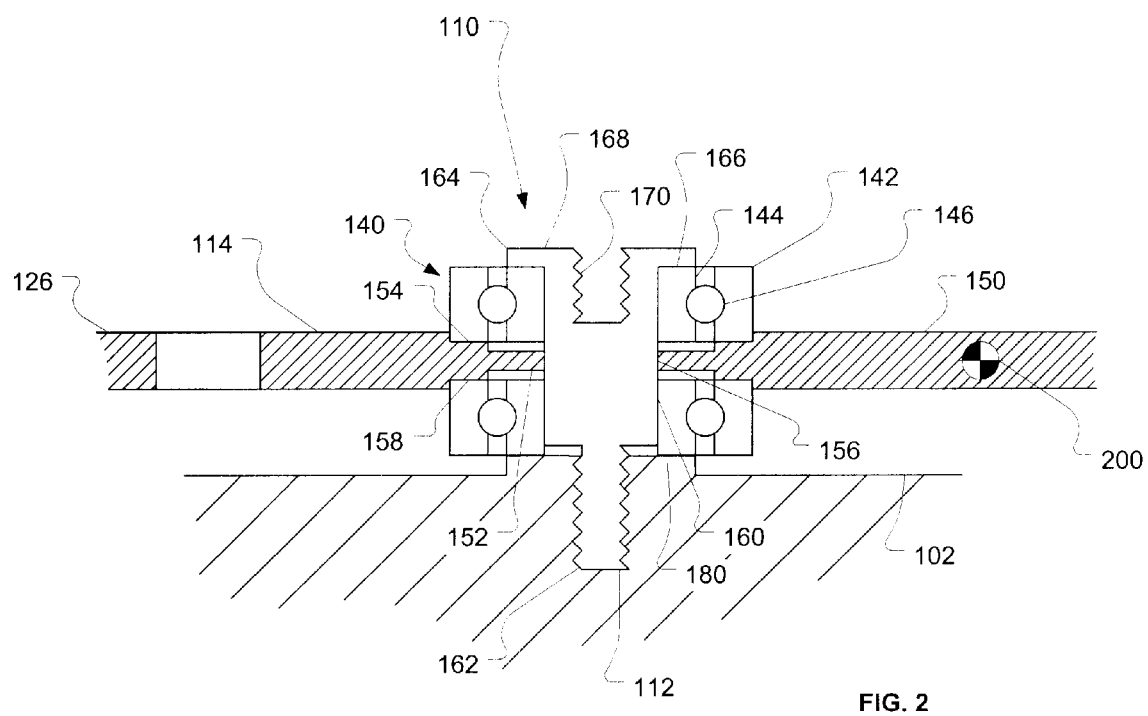
FIG. 2 is a simplified sectional view through an actuator assembly in a disc drive in accordance with a preferred embodiment of the present invention shown in FIG. 1 taken along the line 2—2.

A cross sectional view through the actuator assembly 110 in FIG. 1 is shown in FIG. 2. The actuator assembly 110 in accordance with the present invention incorporates an actuator pivot pin 112 that also functions as a preload adjustment screw. The pivot pin 112 has a head portion 164, a cylindrical shaft portion 160, and a distal threaded end portion 162. The actuator assembly 110 includes a pair of discrete bearing assemblies 140 mounted on the cylindrical shaft portion 160 of the pivot pin 112. Sandwiched between the bearings 140 on the pivot pin 112 is a pivot portion 152 of the actuator arm 114. Each bearing assembly 140 includes an outer race sleeve 142 and an inner race sleeve 144 concentrically spaced apart by ball bearings 146. When the two bearing assemblies 140 are placed on the pivot pin 112 with the actuator pivot portion 152 sandwiched therebetween, and the threaded portion 162 of the pin 112 is threaded into the base 102 of the disc drive 100, the head portion 164 of the pin 112 contacts the inner race 144 of the upper bearing assembly 140. The inner race 144 of the lower bearing assembly 140 contacts the base 102. The outer races 142 of the upper and lower bearing assemblies 140 each contact the pivot portion 152 of the actuator arm 114. The base 102 is formed with a raised shoulder 180 around the threaded bore receiving the threaded portion 162 of the pivot pin 112. The outer race 142 of the lower bearing assembly 140 is beyond the shoulder 180 and thus does not contact the base 102. The shoulder 180 permits the actuator arm 114 to rotate freely on the bearings 140 in a plane of rotation orthogonal to the pivot pin 112. Tightening the pivot pin 112 into the base 102 places a preload force through the bearing assemblies 140 onto the actuator arm 114. This preload force is preferably within a range of 0.5 kg-force to about 2 kg-force and more preferably about 1 kg-force. The threaded portion 162 of the pivot pin 112 preferably has a high friction fit within the threaded bore in the base 102 to provide this preload force.

Once the actuator assembly 110 has been installed, the assembly 110 is excited and the vibration of the actuator assembly 110 in the plane of rotation of the actuator assembly 110 resulting from the excitation is measured. The actuator assembly 110 may be excited by any means including deliberately rotating the actuator assembly 110 via current fed to the voice coil 126 of the voice coil motor 124, delivering an external shock load to the disc drive 100 or vibrating the disc drive 100. The vibration is measured by shining a laser 202 on a benchmark location 200 on the actuator arm 114 and measuring the attributes of the reflected light, but any measuring method may be used including using an accelerometer or by measuring the current induced in the coil 126 of the actuator assembly 110 by the vibration of the arm 114.

In a preferred embodiment, the measured vibration of the actuator assembly 110 is used to determine the resonance behavior of the actuator assembly 110 in the plane of rotation of the actuator assembly 110. Based on the determined resonance behavior, actuator assembly 110 may adjusted to change the resonance behavior to achieve a desired resonance behavior.

Figure 3:
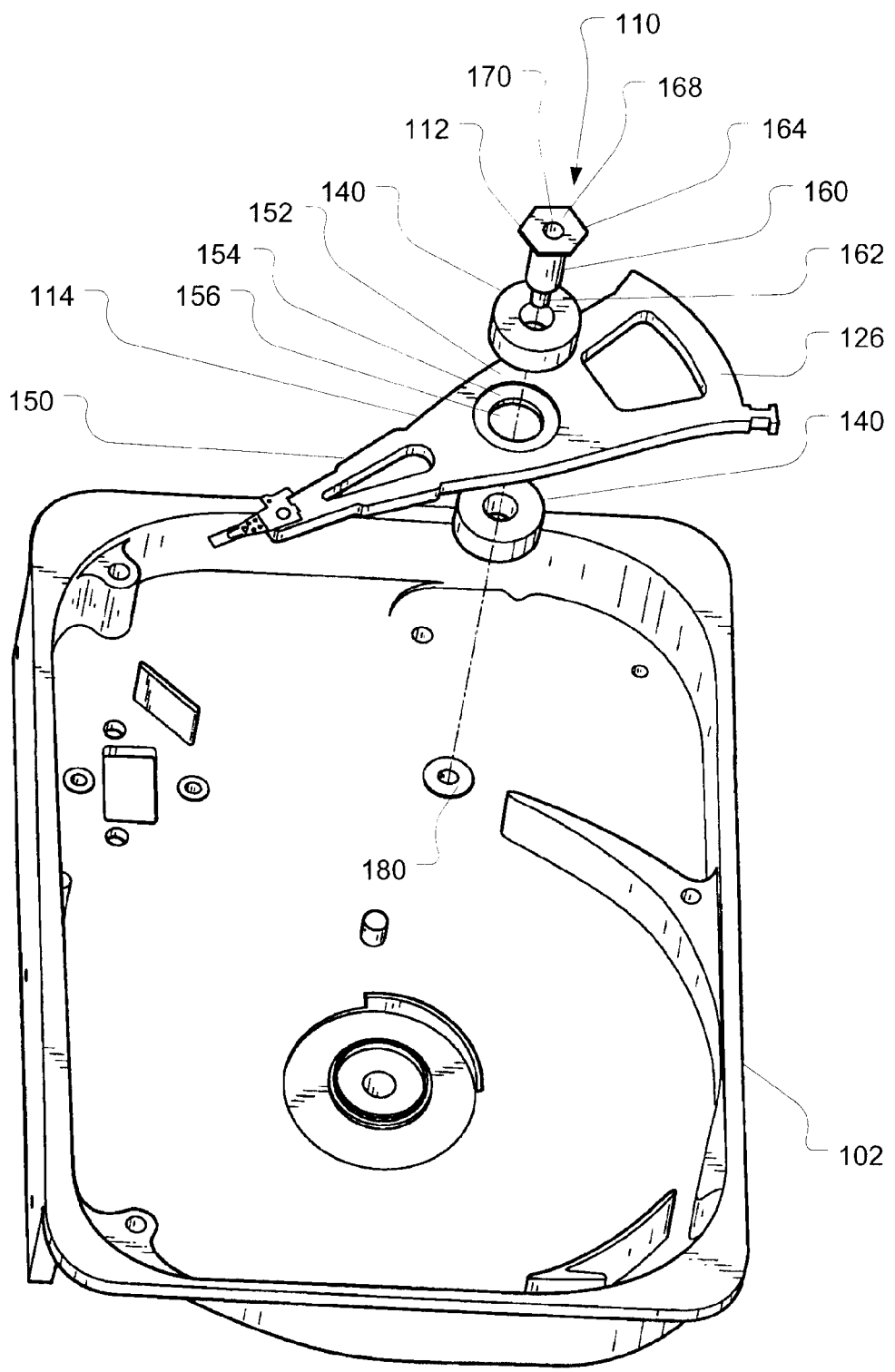
FIG. 3 is a simplified exploded view of the actuator assembly shown in FIG. 1.

An exploded view of the actuator assembly 110 in accordance with another embodiment of the present invention is shown in FIG. 3. The figure shows an actuator assembly 110 comprising two discrete bearing assemblies 140, an actuator arm 114, and a pivot pin 112. Each bearing assembly 140 includes an outer race sleeve 142 and an inner race sleeve 144 concentrically spaced apart by a number of ball bearings 146. The actuator arm 114 consists of a coil 126 opposite an extended arm portion 150 to which the flexure 116 is attached and a pivot portion 152 between the coil 126 and arm portion 150. The pivot portion 152 has an upper surface 154 for contacting an outer race 142 of an upper bearing assembly 140 and lower surface 158 for contacting the outer race 142 of a lower bearing assembly 140. In addition, the pivot portion 152 defines a central aperture 156 therethrough, through which the pivot pin 112 can penetrate the actuator arm 114. The pivot pin 112 comprises a shaft portion 160, a lower threaded portion 162 for fastening the pin 112 to the disc drive 100, and an upper flange portion 164. The upper flange portion 164 comprises a lower surface 166 for contacting the inner race 144 of the upper bearing assembly 140, an upper surface 168 for contacting the disc drive cover 104 and a central hole 170 threaded for accepting a mounting screw (not shown).

The actuator assembly 110 is assembled so that the actuator arm 114 is sandwiched between the upper and lower bearing assemblies 140, all of which are penetrated by and fastened to the disc drive 100 by the pivot pin 112 as shown in FIG. 3. The fastening force exerted by the pivot pin flange portion 164 on the inner race 144 of the upper bearing assembly 140 is transferred through the upper bearing assembly's ball bearings 146 to the outer race 142 of upper bearing assembly 140 and onto the upper surface 154 of the pivot portion 152 of the actuator arm 114. The force on the actuator arm 114 is subsequently transferred to the outer race 142 of the lower bearing assembly 140, through its ball bearings 146 to its inner race 144 and onto a surface 180 of the disc drive base 102. Thus, the fastening force also preloads the bearing assemblies 140 and adjusting the fastening force will simultaneously adjust the preload on the bearing assemblies 140.

In another preferred embodiment, the actuator assembly 110 comprises multiple actuator arms 114 and bearing assemblies 140. In that embodiment, the actuator arms 114 are shaped such that the fastening force also preloads all the bearing assemblies 140.

In a preferred embodiment of the present invention, the resonance behavior of the actuator assembly 110 is adjusted to achieve a desired resonance behavior. In the embodiment, the actuator assembly 110 is excited and the vibration of the actuator assembly 110 in the plane of rotation of the actuator assembly 110 resulting from the excitation is measured. The actuator assembly 110 is excited by fastening the actuator assembly 110 to the disc drive 100 with the pivot pin 112, although any means may be used including deliberately rotating the actuator assembly 110, delivering an external shock load to the disc drive 100 or vibrating the disc drive 100. The vibration is measured by shining a laser (not shown) on a benchmark location on the actuator arm 114 and measuring the attributes of the reflected light, but any measuring method may be used including using an accelerometer or by measuring the current induced in the coil 126 by the vibration of the actuator assembly 110. The resonance behavior of the actuator assembly 110 in the plane of rotation is determined from the measured vibration. Based on the determined resonance behavior, the preload on the bearing assemblies 140 is increased by tightening the pivot pin 112. The preload is increased until the desired resonance behavior is achieved.

In a preferred embodiment, the vibration is measured and the resonance behavior is determined during the initial fastening of the actuator assembly 110 to the disc drive 100 so that the desired resonance behavior is achieved at that time.

In summary, the present invention can be viewed as a method of measuring vibrational resonance in an actuator assembly (such as 110) having an actuator arm (such as 114) in a disc drive (such as 100). The first step of the method comprises mounting an actuator assembly (such as 110) onto a pivot pin (such as 112) in a disc drive (such as 100) for rotation of the actuator assembly (such as 110) in a plane. The second step comprises exciting the actuator assembly (such as 110). The third step comprises measuring vibration in the actuator assembly (such as 110) resulting from the exciting step in the plane of rotation of the actuator assembly (such as 110). The measuring step preferably includes determining a resonant frequency from the measured vibrations of the actuator assembly (such as 110). The actuator assembly (such as 110) is excited by fastening the actuator assembly (such as 110) to the disc drive (such as 100), but may also be excited by rotating the actuator assembly (such as 110) about the pivot pin (such as 112) or delivering an external shock load to the disc drive (such as 100). The vibration of the actuator arm (such as 114) is measured by shining a laser on the actuator arm (such as 114) and measuring the attributes of laser light reflected from the excited actuator assembly (such as 110) but may also be measured by an accelerometer placed on the actuator arm (such as 114) or by measuring the induced current in a voice coil (such as 126) attached to the actuator assembly (such as 110) caused by the vibration of the actuator arm (such as 114) in the plane of rotation.

Alternatively, the invention may be viewed as a method of providing a preload on an actuator assembly (such as 110) in a disc drive (such as 100) to optimize vibrational resonance of the actuator assembly (such as 110). The first step of the method is mounting an actuator assembly (such as 110) onto a pivot pin (such as 112) having an axis in a disc drive (such as 100) for rotation of the actuator assembly (such as 110) in a plane normal to the axis. The second step is fastening the actuator assembly (such as 110) to the disc drive (such as 100) to a predetermined preload with a fastener. The actuator assembly (such as 110) is preferably fastened by securing the assembly (such as 110) with the pivot pin (such as 112), but may also be secured by a screw or by a press-fit fastener. Next, the actuator assembly (such as 110) is excited, preferably by the fastening performed in the second step, but the source of the excitation may be rotating the actuator assembly (such as 110) about the pivot pin (such as 112) by a controlled application of a current to a voice coil (such as 126) attached to the actuator assembly (such as 110) or an external shock load delivered to the disc drive (such as 100).

After excitation, the vibration of the actuator assembly (such as 110) in the rotational plane caused by the exciting step is measured. The measurement is preferably made by shining a laser beam on the actuator arm (such as 114) and measuring the attributes of reflected light from the excited actuator assembly (such as 110) but may also be made by using an accelerometer or by measuring the induced current in the voice coil (such as 126) caused by vibration of the actuator arm (such as 114) in the plane of rotation. The fifth step is determining a resonant frequency from the measured vibrations of the actuator assembly (such as 110). The final step is adjusting the fastener preload to change the resonant frequency to a desired value, preferably by increasing the preload. In the preferred embodiment, the vibration of the actuator assembly (such as 110) is measured and the resonant frequency determined while the fastener preload is increased. The preload is adjusted a desired resonance state of the actuator assembly (such as 110) is obtained.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the pivot pin 112 may be press-fit to the disc drive base 102 rather than screwed into the base 102 to fasten the actuator assembly 110 and adjust the preload on the bearing assemblies 140 or the pivot pin 112 may not include a flange 164 and the fastening force and preload is applied by means of a fastener (not shown) fastened to the upper end of the pivot pin 112. Numerous other changes may be made which will readily suggest themselves to those skilled in the art and which are encompassed in the spirit of the invention disclosed and as defined in the appended claims.

What is claimed is:

1. A method of minimizing vibrational resonance in an actuator assembly in a disc drive during manufacture of the disc drive, the method comprising the steps of:
  a) mounting an actuator assembly onto a pivot in a disc drive for rotation of the actuator assembly in a plane;
  b) exciting the actuator assembly; and
  c) measuring vibration in the actuator assembly resulting from the exciting step b) in the plane of rotation of the actuator assembly; and
  d) fastening the actuator assembly to the pivot so as to minimize measured vibration in the actuator assembly resulting from exciting step b).

2. The method of claim 1 wherein the measuring step c) further comprises determining a resonant frequency from the measured vibrations of the actuator assembly.

3. The method of claim 1 wherein the exciting step b) further comprises exciting the actuator assembly by fastening the actuator assembly to the disc drive.

4. The method of claim 1 wherein the exciting step b) further comprises rotating the actuator assembly about the pivot by passing current through a voice coil in the actuator assembly.

5. The method of claim 1 wherein the exciting step b) further comprises delivering an external shock load to the disc drive.

6. The method of claim 1 wherein the measuring step c) further comprises shining a laser on the actuator arm and measuring the attributes of laser light reflected from the excited actuator assembly.

7. The method of claim 1 wherein the measuring step c) further comprises using an accelerometer to measure the vibration of the actuator assembly.

8. The method of claim 1 wherein the measuring step c) further comprises measuring the induced current in a voice coil attached to the actuator assembly caused by the vibration of the actuator arm in the plane of rotation.

9. A method of providing a preload on an actuator assembly in a disc drive to optimize vibrational resonance of the actuator assembly comprising the steps of:

a) mounting an actuator assembly in a disc drive onto a pivot having an axis for rotation of the actuator assembly in a plane normal to the axis;

b) fastening the actuator assembly to the disc drive to a predetermined preload with a fastener;

c) exciting the actuator assembly;

d) measuring vibration of the actuator assembly in the rotational plane caused by the exciting step c);

e) determining a resonant frequency from the measured vibrations of the actuator assembly; and f) adjusting the fastener preload to change the resonant to a desired value.

10. The method of claim 9 wherein the fastening step b) comprises securing the actuator assembly to the pivot with a screw.

11. The method of claim 9 wherein the fastening step b) comprises securing the actuator assembly to the pivot with a press-fit fastener.

12. The method of claim 9 wherein the pivot in the mounting step a) is the fastener used to fasten the actuator assembly in the fastening step b).

13. The method of claim 9 wherein the exciting step c) comprises exciting the actuator assembly while fastening the actuator assembly to the disc drive in the fastening step b).

14. The method of claim 9 wherein the exciting step c) comprises rotating the actuator assembly about the pivot by a controlled application of a current to a voice coil in the actuator assembly.

15. The method of claim 9 wherein the exciting step c) comprises delivering an external shock load to the disc drive.

16. The method of claim 9 wherein the measuring step d) comprises shining a laser beam on the actuator arm and measuring the attributes of reflected light from the excited actuator assembly.

17. The method of claim 9 wherein the measuring step d) comprises using an accelerometer to measure the vibration of the actuator assembly.

18. The method of claim 9 wherein the measuring step d) comprises measuring induced current in a voice coil in the actuator assembly caused by vibration of the actuator arm in the plane of rotation.

19. The method of claim 9 wherein the adjusting step f) comprises increasing the preload on the fastener used in the fastening step b).

20. The method of claim 9 wherein the measuring step d), the determining step e) and the adjusting step f) are repeated until a desired resonance state of the actuator assembly is obtained.

* * * * *